United States Patent [19]
Davis

[11] 3,990,171
[45] Nov. 9, 1976

[54] ARTIFICIAL FISH LURE
[75] Inventor: Jack E. Davis, Georgetown, Fla.
[73] Assignee: Victor Comptometer Corporation, Chicago, Ill.
[22] Filed: Aug. 1, 1975
[21] Appl. No.: 601,056

[52] U.S. Cl. .............................. 43/42.17; 43/42.28; 43/42.4; 43/42.44
[51] Int. Cl.² .......................................... A01K 85/00
[58] Field of Search ............ 43/42.44, 42.17, 42.28, 43/42.4, 42.37

[56] References Cited
UNITED STATES PATENTS

| | | | |
|---|---|---|---|
| 1,582,171 | 4/1926 | Foss | 43/42.17 |
| 1,586,178 | 5/1926 | Comstock | 43/42.44 |
| 1,896,132 | 2/1933 | Berberich | 43/42.28 |
| 2,307,478 | 1/1943 | Adam | 43/42.17 |

Primary Examiner—Warner H. Camp
Attorney, Agent, or Firm—Woodhams, Blanchard and Flynn

[57] ABSTRACT

An artificial fish lure having a relatively flat and wide body portion with a downwardly projecting integral keel. Skirt means comprising a plurality of elongated narrow and flexible ribbons is secured to the upper part of said body portion and is capable of extending rearwardly or upwardly therefrom. Hook means is pivotally mounted upon the rearward end of said body portion for movement around a horizontal axis between a position extending rearwardly from the body portion and a position extending substantially directly upwardly from said body portion. A spinner in the form of a double bladed propeller is mounted upon the front end of the body portion adjacent line engaging means.

6 Claims, 6 Drawing Figures

ARTIFICIAL FISH LURE

BACKGROUND OF THE INVENTION

This invention relates in general to an artificial fish lure and, more particularly, to a type thereof having means for guiding the lure through the air and through the water.

FIELD OF THE INVENTION

Persons acquainted with the manufacture and use of fish lures have become aware of the fact that the type of fish lures normally used for casting encounter a number of problems during their use and operation which render them less than satisfactory in many instances. For example, those having a single barbed hook thereon are conventionally built so that the hook is rigidly connected to the body of the lure. Accordingly, particularly when the lure is cast into shallow water, it frequently strikes logs, rocks or the like and, because of the inflexibility of the hook's attachment to the body of the lure, the hook is often broken loose from the lure body by such impacts.

It is also known that it is desirable to have lures move through the water in a particular attitude relative to the surface of the water. That is, certain types of lures have top sides and bottom sides and it is desirable, if not essential, for them to move through the water with the top and bottom sides in the proper locations. However, when the lure is cast, as from a boat, it tends to tumble through the air and, accordingly, frequently lands in the water in an inverted position.

It is also known that game fish are frequently found in shallow water where they feed during the early morning and late afternoon hours. Thus, it is desirable to provide an artificial fish lure which can be used in relatively shallow waters without becoming entangled with logs, rocks, weeds and underbrush and, moreover, which can be retrieved relatively closely to the surface of the water while remaining beneath such surface. This gives the lure the appearance of a live bait which has fallen off the bank into the adjacent water and is trying to escape.

Accordingly, a primary object of this invention is the provision of an artificial fish lure which can be cast into relatively shallow water without the risk of damaging the connection between the hook and the body portion of the lure where the lure has a single barbed hook connected thereto.

A further object of this invention is the provision of an artificial fish lure, as aforesaid, including skirt or streamer means comprised of a plurality of relatively long and narrow ribbons which act as a rudder or guide as the lure passes through the air and water, said skirt also serving somewhat as a weed deflecting device for the hook means.

A further object of this invention is the provision of an artificial fish lure, as aforesaid, having a relatively wide and flat body portion with an integral keel whereby the fish lure, even though nonbuoyant, can be caused when being retrieved at a relatively normal speed for bait retrieval to move upwardly toward the surface of the water.

Other objects an purposes of this invention will become apparent to persons familiar with this type of fish lure upon reading the following description and examining the accompanying drawings in which:

FIG. 1 is a side elevational view of an artificial fish lure embodying the invention.
FIG. 2 is a bottom view of said fish lure.
FIG. 3 is a sectional view taken along the line III—III in FIG. 2.
FIG. 4 is a front elevational view of said fish lure.
FIG. 5 is a sectional view taken along the line V-V in FIG. 1.
FIG. 6 is an enlarged fragment of FIG. 3.

For convenience in description, the terms "upper," "lower," "front," "rear" and terms of similar import will have reference to the fish lure as appearing in FIG. 1, the frontward end being at the left of such figure. The terms "inner," "outer" and derivatives thereof will have reference to the geometric center of said fish lure and parts thereof.

SUMMARY OF THE INVENTION

The objects and purposes of the invention, including those set forth above, have been met by providing an artificial fish lure having a relatively wide and flat body with an integral, downwardly extending keel. A single barbed fish hook is mounted upon the rearward end of the body for movement around a horizontal axis transverse of said body between positions extending rearwardly of the body and upwardly from the body. Skirt means comprising a plurality of elongated narrow ribbons is secured to the upper part of the body about midway between the ends thereof, said shirt means being flexible and serving as a rudder for the lure through the air and water. A double bladed propeller is rotatably supported upon the front end of the lure body adjacent the line engaging means thereof.

DETAILED DESCRIPTION

Figure 1:
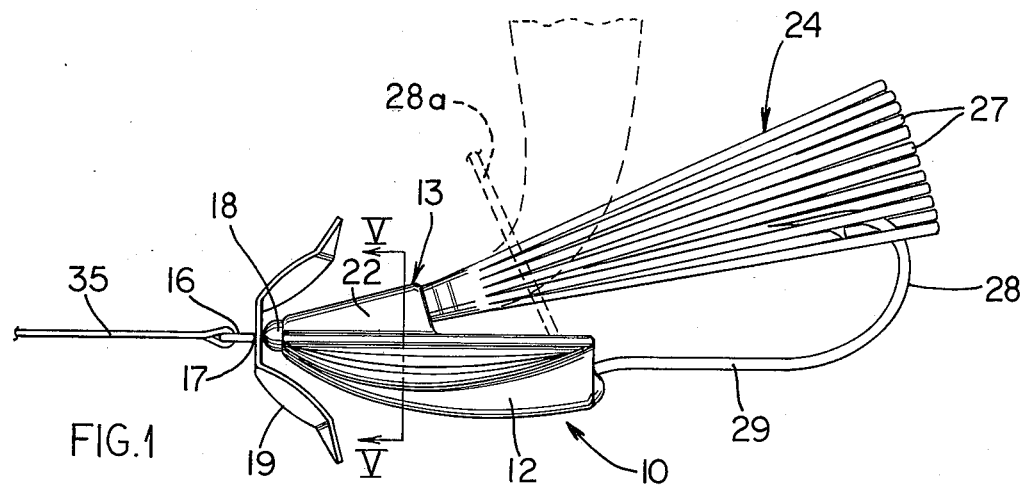
Figure 2:
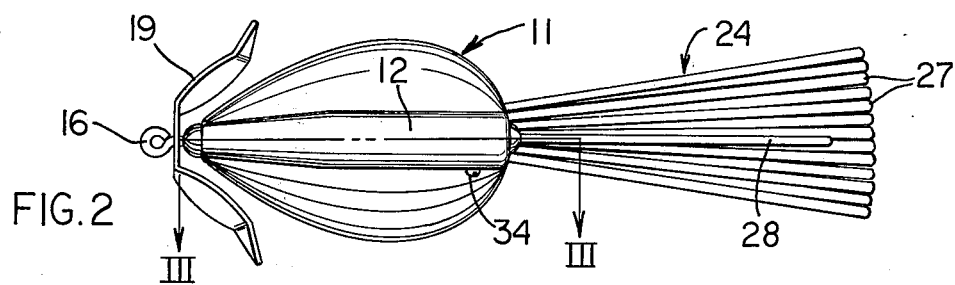
Figure 4:
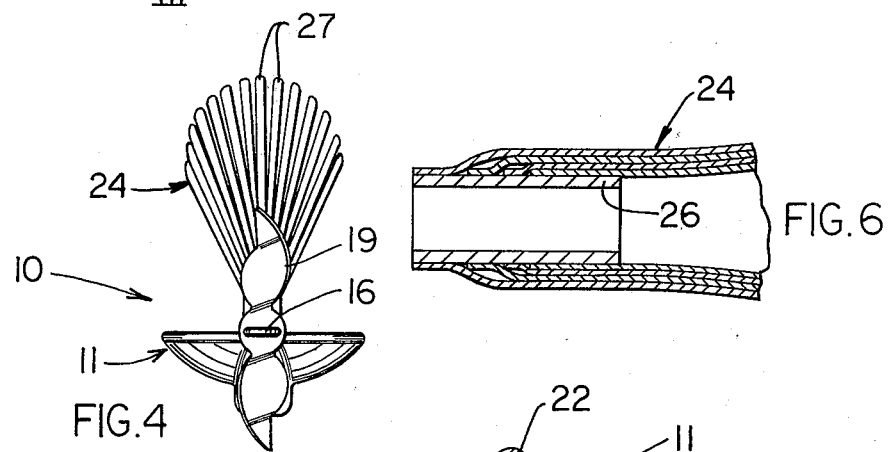

The artificial fish lure 10, a preferred embodiment of which is disclosed in FIG. 1, is comprised of a body 11 which is relatively flat and wide as shown in FIGS. 2 and 4. Said body has an integral, downwardly extending keel 12 which guides the lure through the water in a lengthwise direction. The front end of the body is somewhat pointed whereas the rearward end is fairly blunt and the top surface of the body is flat except for the skirt mount 13 which projects upwardly therefrom and is integral therewith. The lower surface of the body 11 curves upwardly on both sides of the keel 12 so that said lower surface substantially converges with the upper flat surface of the body along the lateral edges thereof. This contour also helps to stabilize the movement of the lure through the water, just as dihedral in the wings of an aircraft tend to provide horizontal stability for an aircraft.

Figure 3:
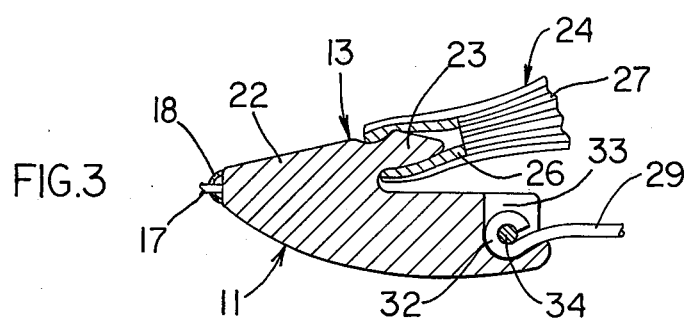

A line engaging eyelet 16 has a shank 17 (FIG. 3) which is embedded in and extends lengthwise of the front end of the body 11 A bearing 18, which in this instance is a semispherical shell having an opening through the central portion thereof, is sleeved upon the shank 17. A spinner 19 in the form of a double bladed propeller having swept-back blades is rotatably mounted upon the shank 17 between the eyelet 16 and the bearing 18.

The skirt mount 13 (FIG. 3) has an elongated front part 22 which is integral with and projects upwardly from the upper surface of the body 11 between the front end thereof and a location approximately midway between the front and rear ends thereof. Thus, said front part 22 also serves as a rudder for the lure when the lure is being retrieved below the surface of the water. Integral with the rearward end of the front part 22 is a harpoon-shaped projection 23 which extends rearwardly from the front part 22 and diverges slightly rearwardly relative to the upper surface of the body 11.

A skirt 24 (FIGS. 3 and 6) is comprised of a resiliently flexible cylinder 26 which is of smaller diameter than the radially enlarged central portion of the projection 23, but which can be sleeved upon the projection 23 by applying moderate force thereto. A plurality of elongated flexible elements or ribbons 27 are secured to the outer surface of the cylinder 26 and extend rearwardly therefrom a distance almost twice the length of the body 11.

Figure 6:
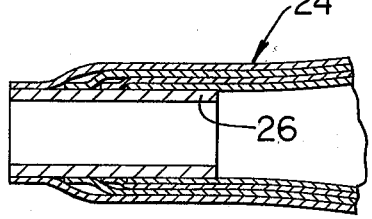
Figure 5:
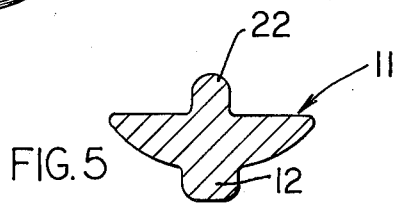

In one preferred embodiment, the elements 27 are provided by utilizing a sheet of resiliently flexible material which is then slit to form a plurality of thin ribbons which extend toward but are spaced somewhat from one edge of the sheet. The unslit edge of the sheet is then wrapped around the cylinder 26 and secured thereto by adhesive means. As shown in FIG. 6, the skirt may be comprised of several slit sheets wrapped around the cylinder and arranged in slightly spaced intervals so that they are largely overlapped.

The skirt 24, including the cylinder and elements attached thereto, is prevented from accidental disengagement from the lure body by virtue of the fact that the cylinder 26 snugly grips the projection 23 and particularly the enlarged central portion thereof. However, by exerting manual force upon the skirt 24 in a rearward direction, it can be removed from the projection 23 for repair and/or replacement.

A hook 28 has a shank 29 with an eyelet 32 (FIG. 3) on one end thereof. The eyelet 32 is preferably substantially coplanar with the remainder of the hook. The body 11 and keel 12 are provided with an upwardly and rearwardly opening slot 33 which is only slightly wider than the thickness of the eyelet 32 which is disposed within the slot 33. A pin 34 such as a screw, extends horizontally and transversely through the rearward end portion of the keel 12 and through the slot 33 so that it can also extend through the eyelet 32 for pivotally supporting the hook 28 upon the body 11. The slot 33 is arranged so that the hook can pivot between the solid line position 28 and the broken line position 28A, as shown in FIG. 1.

The elements 27 on the skirt 24 are preferably of such a length that they will extend beyond the rearward end of the hook 28 and, in normal movement of the hook through the water, will tend to cover up or obscure the barbed end of the hook.

OPERATION

The eyelet 16 is connected to a fish lure 35 (FIG. 1) which, for example, is connected to a reel on a casting rod, not shown, of any conventional type. The hook is preferably positioned for casting as shown in solid lines in FIG. 1 so that it extends rearwardly from the body 11. The lure can then be cast by the person handling the casting rod in a substantially conventional manner. As the lure approaches the end of the cast and begins its downward movement toward the water, the elements 27 of the skirt 24 take positions relative to the lure and water about as shown in broken lines in FIG. 1. Thus, said elements tend to act as a rudder to steer the lure downwardly unto the surface of the water in its proper upright position. As the lure drops toward the water, the elements 27 also have a parachute effect which materially slows the speed of the lure toward the water.

If, as in the preferred embodiment, the lure as a whole is nonbuoyant, it will start to settle in the water after impact. However, the elements 27 will tend to maintain the horizontal stability of the lure during settling. Since the hook faces upwardly, the lure can be permitted to move to the bottom of the water without substantial risk of being entangled with logs, stones or debris at the bottom of the water.

If, during the casting operation, the lure should strike an obstruction, such as a rock, a log, or the like, the hook is capable of pivoting upwardly into its broken line positions of 28A in FIG. 1, to cushion the impact of the lure with the obstruction and, also, to prevent damage to the connection between the hook and the body. However, as soon as the lure is moved forwardly through the water, as it is retrieved by the reel, the frictional engagement between the shank of the hook and the water will move said hook back into its rearwardly extending, solid line position of FIG. 1. Accordingly, as the lure is retrieved, the elements 27 will serve two functions. First, they will act as a rudder augmenting the steering and guiding feature of the keel and, also, will serve not only to somewhat obscure the barbed end of the hook, but also to act as device for deflecting weeds away from the hook.

The lower surface of the body 11, which is in the shape of the body of a skiff or hydroplane, causes the lure to move upwardly in the water as it is retrieved. Thus, depending upon the speed of retrieval of the lure, it can be caused to remain near the bottom of the water or near the top of the water.

The spinner 19 rotates in a substantially conventional manner as the lure is moved through the water and thereby causes an action within the water which attracts game fish. The elements 27 may be colored so that they also attract game fish. Likewise the body 11 may be provided with markings which cause it to resemble a live bait.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An artificial fish lure, comprising:
a relatively wide and flat body means having an integral, downwardly extending keel, said body means having an upwardly and rearwardly opening slot in the rearward end thereof;
said body means having a substantially flat upper surface and a curved convex lower surface which is joined to the opposite edges of said upper surface, said downwardly extending keel comprising an elongated riblike element which extends in the lengthwise direction of said body means and projects downwardly from said lower surface and having a width which is substantially smaller than the width of said body means so that said lower surface includes convex lower surface portions which are disposed on opposite sides of said riblike element and extend sidewardly and upwardly so as to connect with said upper surface;

skirt mounting means integral with and extending upwardly from the upper surface of said body means in the frontward region thereof, said skirt mounting means including a rearwardly extending projection;

skirt means comprising a plurality of elongated flexible elements secured to said skirt mounting means and arranged to extend rearwardly and upwardly therefrom, said skirt means being capable of acting as a rudder line engaging means secured to the front end of said body means;

hook means having a shank with an eyelet, said eyelet being substantially within the plane defined by the hook means and being disposed substantially within said slot; and pin means extending through said eyelet and into said body means for pivotally securing said hook means to said body means and for permitting said hook means to be pivotally moved relative to said body means between a first position extending rearwardly and substantially lengthwise of said body means and a second position extending upwardly from said body means and substantially transversely thereof.

2. An artifical fish lure according to claim 1, including a double bladed propeller rotatably supported upon the front end of said body means for rotation around an axis lengthwise thereof.

3. An artificial fish lure according to claim 1, including stop means fixedly associated with said body means and extending across the lower portion of said slot, said stop means being positioned for engagement with the shank of said hook means when said hook means is in said first position so as to prevent said hook means for swinging downwardly away from said first position, said hook means when in said first position having the shank thereof projecting rearwardly of said body means substantially in the lengthwise direction thereof, said hook means when in said second position being swung upwardly away from said first position so that said shank projects upwardly in transverse relation with respect to the lengthwise direction of said body means.

4. An artifical fish lure according to claim 3, wherein said skirt mounting means includes an elongated riblike portion which extends centrally of said body means in the lengthwise direction thereof and projects upwardly from said upper surface, said riblike portion extending from the forward end of said body means to a point which is disposed a substantial distance forwardly from the rearward end of said body means, said riblike portion tapering upwardly as it projects rearwardly of the body means, said riblike portion having a width which is substantially smaller than the overall width of said body means, and said rearwardly extending projection being formed on and projecting rearwardly from the rearward end of said riblike portion.

5. A artificial fish lure according to claim 4, wherein said skirt means has a sleeve portion at the forward end thereof which is of a resiliently flexible material, said sleeve portion being positioned around and resiliently engaged with said rearwardly extending projection.

6. A fish lure according to claim 1, wherein said skirt mounting means includes an elongated riblike portion which extends centrally of said body means in the lengthwise direction thereof and projects upwardly from said upper surface, said riblike portion extending from the frontward end of said body means to a point which is disposed a substantial distance forwardly from the rearward end of said body means, said riblike portion tapering upwardly as its projects rearwardly of the body means, said riblike portion having a width which is substantially smaller than the overall width of said body means, and said rearwardly extending projection being formed on and projecting rearwardly from the rearward end of said riblike portion.

* * * * *